Jan. 29, 1963  R. J. CHAMBERLAIN  3,075,561
GRID MAKING MACHINES
Filed Sept. 26, 1958
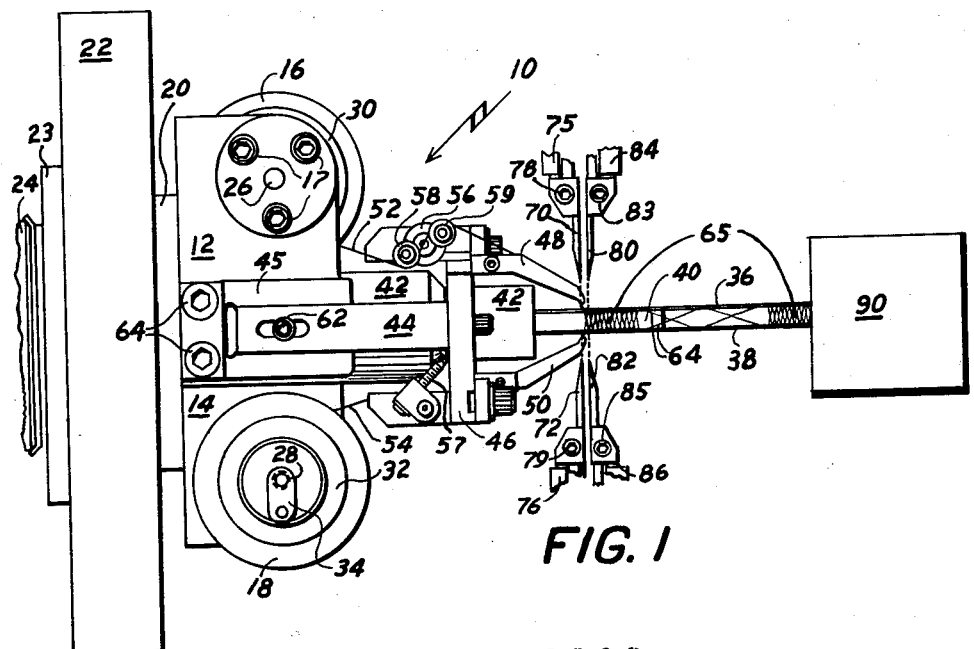
FIG. 1
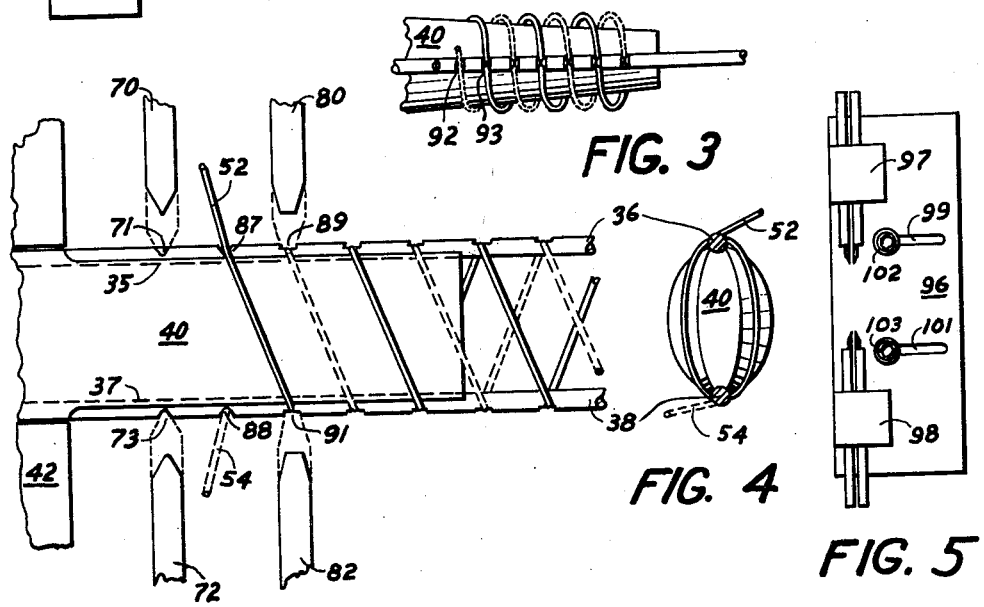
FIG. 3
FIG. 2
FIG. 4
FIG. 5
INVENTOR
ROBERT J. CHAMBERLAIN
BY N. Vincent Hanska
ATTORNEY

United States Patent Office 3,075,561
Patented Jan. 29, 1963

3,075,561
GRID MAKING MACHINES
Robert J. Chamberlain, Natick, Mass., assignor to Raytheon Company, Lexington, Mass., a corporation of Delaware
Filed Sept. 26, 1958, Ser. No. 763,592
5 Claims. (Cl. 140—71.5)

This invention relates to a novel grid making machine adapted for the manufacture of the wound type of grid electrode as used in radio tubes and other types of electrical space discharge devices. More particularly, the invention relates to a multiple bobbin grid making machine for the production of wound grids of the type in which two or more wires are wound parallel to one another in the form of a continuous helix.

This invention constitutes an improvement over the grid making machine disclosed in Patent No. 2,181,288, of Henry M. Washburn, issued November 28, 1939.

The usual method of making grids of the single wire helical wound type is to cut or notch a series of grooves in a pair of side wires, to wind a single winding wire in these grooves, and to swedge the grooves over the winding wire. Grids made on the usual grid making machine inevitably are produced with distorted side rods unless special bending devices are used to reshape the side rods during the grid making process or a subsequent straightening process is employed. This is particularly true when the swedging and cutting members for fastening each turn of a single wire grid to each side rod are positioned at alternate intervals along the sides of the arbor on which the grid is formed. For this reason, the cutting and swedging strokes are alternately applied to the side rods in a step fashion which tends to flex the side rods first in one direction and then in the other direction. Additionally, since the distance between grooves in the side rods of a single winding machine varies according to the pitch, the cutting and notching tools must be set at precisely one half the pitch in their linear displacement along the arbor in order to produce a true helix as is required for proper electrode operation. It is therefore desirable to provide a grid forming mechanism in which the forces applied to the side rods in the cutting and swedging operation are so controlled that the usual tendency of the side rods to bow inwardly or to damage the arbor is substantially eliminated.

In accordance with the grid winding machine of this invention, the tendency for distortion of the side rods can be substantially eliminated by causing the cutting and notching tools to contact the side rods simultaneously from directly opposite positions along the arbor, thereby substantially cancelling any force tending to bend the side rods out of a straight line. To make this possible, a pair of equally spaced winding wires are fed from two wire spools to the side rods in a manner in which the first of the parallel helical wires is adapted to be laid in the first notch on one side rod, and the second parallel helical wire is laid in the corresponding and oppositely disposed notch in the other side rod. Thus, while the pitch, or turns-per-inch of the winding remains the same as with a single helical winding, the lead or helix angle of each parallel wire is doubled, so that for every notch in one side rod there is a corresponding notch directly opposite in the other side rod. In this manner, equal and opposite notching and swedging forces are applied to the side rods and the arbor or mandrel supporting the side rods remains undisturbed by these forces so that a subsequent process for straightening the side rods becomes unnecessary.

The foregoing and other objects of the invention will be best understood from the following description of an exemplification thereof, reference being had to the accompanying drawing wherein:

FIG. 1 is a plan view of a portion of the grid machine showing the winding mechanism and the swedging and notching elements;

FIG. 2 is an enlarged view of the grid arbor supporting the side rods and the associated cutters and swedges, illustrating the formation of the grid;

FIG. 3 is a side view of the grid arbor of FIG. 2, showing the taper of the arbor and the relationship of the arbor, side rods and grid windings;

FIG. 4 is an end view of the tapered arbor showing the notches and parallel windings swedged therein; and FIG. 5 is a diagrammatic view of a base plate rigidly mounting the notching and swedging elements to permit both sets of elements to be adjusted as a unit to control the minor diameter of the grid turns.

Referring to FIG. 1, a winding mechanism 10 includes a pair of oppositely disposed supporting brackets 12 and 14 which rotatably support a pair of spools or bobbins 16 and 18 connected thereto by screws 17. The supporting brackets are connected to a rotatable supporting shaft 20 which rotates in a bearing, not shown, in head supporting standard 22. The rotatable supporting shaft 20 is provided with a collar 23 which is attached to a drive shaft 24 and provided with a driving motor, not shown, for rotating the winding mechanism 10. The rotating spools or bobbins 16 and 18 rotate about shafts 26 and 28 which are attached to the support brackets 12 and 14 respectively. These spools are positioned 180 degrees apart and are concentrically mounted on hysteresis brakes 30 and 32, each provided with an adjustable tension locking sleeve 34.

The driving shaft 24 and supporting shaft 20 are hollow so as to permit the grid side rods 36 and 38 to pass through it to a stationary arbor 40, as shown in FIG. 2, formed on the outer end of an arbor shank 42. The arbor shank and arbor are provided with grooves 35 and 37 on opposite sides thereof so that the side wires 36 and 38 may extend therethrough and lie on opposite sides of the arbor 40. The arbor 40, as shown in FIG. 3, is slightly tapered so as to decrease its thickness towards the outer end. Since the minor diameter of the grid which is formed is dependent upon the thickness of the arbor in the grid-forming position, very fine adjustments in the exact minor diameter of the grid can be obtained by moving the threading mechanism longitudinally with respect to the arbor in a manner which will be described in detail.

Secured to supporting shaft 20 is an adjustable mounting plate 44 to which is adjustably attached cross arm 46 which supports thread guides 48 and 50 in order to guide the grid wires to the side rods. As shown, grid wires 52 and 54 are fed around a spring-loaded tension device 56 including tension rollers 58 and 59. These rollers maintain a constant tension on the winding wires and prevent snatching so that both of the lateral winding wires will be fed evenly from the two bobbins.

When the tension on the winding wire terminates, as during breakage or exhaustion of wire from the spools, a sensing contact 57 touches the ground machine to open a relay, not shown, to stop the machine. The adjustable mounting plate 44 contains a slot which receives a locking bolt 62. This bolt may be loosened to permit the mounting plate 44 and the cross arm 46 carrying the threading elements to move along the arbor whenever it is desired to change the grid-forming position in order to change the minor diameter of the grid. As shown, the mounting plate 44 rests upon a recessed bracket 45 secured to an extension of supporting shaft 20 by bolts 64.

As the side wires 36 and 38 pass along the sides of arbor 40, the grid winding wires 52 and 54 are wound thereon and are secured to the side rods in order to form the grid. For the purpose of securing the winding wires to the side rods, two cutters 70 and 72, having cutting edges, form a plurality of notches in the side wires 36 and 38, as indicated by the enlarged view shown in FIG. 2. The cutters 70 and 72 are adapted to slide simultaneously back and forth in the plane of the grid, that is, in the plane in which the grooves 73 and 71 lie. In order to reciprocate the cutters into simultaneous engagement with the side wires, each cutter is connected to a cutter-actuating shaft 75 and 76 and motor driven cams, not shown, by means of screws 78 and 79. After the notches have been cut into the side rods 36 and 38, the winding wires 52 and 54 are laid into these notches and wound around the side rods to form a grid. After the winding wires are placed in the notches in parallel fashion, the notches are swedged around the winding wires so as rigidly to affix the winding wire in the side rods 36 and 38. This swedging is also illustrated in FIG. 2.

The oppositely disposed swedges 80 and 82 are adapted to deliver swedging strokes to the side rods by means of swedge actuating shafts 84 and 86 secured by screws 85. These shafts also are connected to a driving mechanism, not shown. Screws 83, 85, 78 and 79 permit adjustment of the impact delivered to each side arm.

After a predetermined number of grid turns, the swedges are deactivated by cams, not shown, during the passage of the leg portions 64 of the grid 65 past the swedging position. The side wires 36 and 38 are moved progressively past the cutting and swedging positions by means of a well-known pulling and cutting mechanism 90, each side wire being continuously fed from a pair of side rod spools, not shown. Also, the gearing and drive mechanism for the opening and closing of the cutters and swedges is not shown, inasmuch as any well-known driving mechanism can be used.

As the side rods 36 and 38 progress along the arbor, the cutters 70 and 72 deliver cutting strokes simultaneously from opposite directions to cut oppositely disposed notches 71 and 73, respectively, in the side rods. At the same time, the rotating wire guides 48 and 50 lay parallel helical wires 52 and 54 into the notches 87 and 88 cut by the previous reciprocating stroke of the cutters. Simultaneously with this operation, the turns of grid wire which have been wound into notches 89 and 91 are swedged or peened securely to the side rods by swedge actuating shafts 84 and 86 delivering swedging strokes simultaneously in opposite directions to the side rods. Since equal and opposite forces are applied to the side rods and arbor by the cutting and swedging strokes, a true helix is formed without any tendency to flex or bend either the side rods or the arbor. In addition, the double winding operation eliminates the requirement of a fine adjustment, which in single winding units, is necessary in order to produce a symmetrical grid.

Referring to FIG. 3, the machine is also adapted to produce any desired pitch of the winding on the side rods. In order to control the minor grid diameter, the horizontal position of the cutting and swedging elements are adjusted laterally along the tapered arbor 40 to bring the swedges opposite the notch corresponding to the desired minor grid diameter. For example, the cutting and notching positions are shown at 92 and 93, respectively, along the tapered top and bottom sides of arbor 40. These turn forming positions correspond to the desired minor grid diameter. To shorten the minor grid diameter, the cutting and swedging tools are slidably adjusted the desired number of turns to the right to a new turn forming position. FIG. 4 shows the maximum and minimum diameter achieved by the tapered arbor.

The simultaneous notching and swedging of a double wind makes it possible to mount both sets of cutting and swedging elements on a common base and move both assemblies as a unit to control the minor grid diameter. In the single winding machines this adjustment, as noted, involves separate units which have to be notched at precisely one half the pitch of the grid being wound in order to produce a symmetrical grid. FIG. 5 shows a diagram of a typical base plate 96 with notching and swedging assemblies 97 and 98 fixed thereto. The base plate is provided with slots 99 and 101 adapted to receive mounting bolts 102 and 103. These bolts are loosened to permit the base plate and cutting and swedging assemblies to slide laterally to a new turn forming position without the separate adjustment of each unit, which is necessary in single winding machines. In addition, all arbor deflection which occurs in a single winding machine is eliminated.

Because the double winding spools rotate at 180 degrees apart, the rotational forces in the winding mechanism are balanced. This results in smoother and quieter operation than possible in the single winding machine in which the weight of a single rotating spool is constantly decreasing as the winding is used. In addition, double, quadruple, or a multiplicity of even numbered parallel windings can be wound on a plurality of side rod wires, with the lead or helix angle increased to double, or quadruple that of the single winding machine. In this manner, slower drive shaft speeds are possible for a given output and snatching which causes breakage of extra fine lateral wires is substantially eliminated.

This completes the description of the particular embodiment of the invention illustrated herein. However, many modifications thereof will be apparent to persons skilled in the art without departing from the spirit and scope of this invention. Accordingly, it is desired that this invention be not limited to the particular details of the embodiment illustrated herein, except as defined by the appended claims.

What is claimed is:

1. In a winding machine, a grid-forming mechanism adapted to wind and secure an even number of equally spaced helical winding wires around a plurality of side rod wires, means for advancing said side rod wires through said machine, means for cutting notches in each associated side rod wire, into which notches said helical winding wires are adapted to be laid, a pair of means for winding said winding wires into said notches, means for swedging said side rod wires upon said winding wires, said cutting means adapted to deliver the force of said cutting strokes simultaneously from opposite directions in a first plane and said swedging means adapted to deliver the force of said swedging strokes simultaneously from opposite directions in a second plane, said cutting means and said swedging means operating in a plane perpendicular to the axis of both of said side rod wires.

2. In a winding machine, a winding arbor having a pair of supporting surfaces at opposite sides thereof, each to support a side rod upon which a plurality of even-numbered equally spaced helical winding wires are to be wound to form a grid, winding means for winding at least a pair of winding wires, a pair of cutters oppositely disposed with respect to said arbor for cutting notches in said side rods, into which notches said winding wires are adapted to be laid, a pair of swedges oppositely disposed with respect to said arbor, said cutters mounted to deliver cutting strokes of substantially equal force simultaneously to said side rods from opposite directions in a first common plane perpendicular to the axis of said side rods and said swedges mounted to deliver swedging strokes of substantially equal force simultaneously to said side rods from opposite directions in a second common plane perpendicular to the axis of both of said side rods, whereby any force from said strokes tending to bend either of said side rods out of a straight line is substantially cancelled, and means for simultaneously winding said winding wires into said notches.

3. In a winding machine, a grid-forming mechanism adapted to wind and secure a pair of helical winding wires around a pair of parallel side rods to form successive grids, including winding means for simultaneously carrying the winding wires around said side rods and winding said wires upon said side rods, means for cutting notches in said side rods from opposite directions in a first common plane, swedging means for fastening each winding wire into the notches in said side rods by means of a tight connection at each successive turn for a predetermined number of turns, said swedging means adapted to apply force to alternate and oppositely disposed turns formed by said parallel helical wires simultaneously from opposite directions and along a line in a second common plane passing substantially through and perpendicular to the center of both of said side wires, whereby any component of force extending parallel to the axis of said side rods is substantially cancelled, and means for advancing said side rods with said winding wires thereon through said machine.

4. In a winding machine, a winding arbor having a pair of tapered supporting surfaces at opposite sides thereof, each to support a side rod upon which a pair of equally spaced helical winding wires are to be wound to form a grid, winding means for winding at least a pair of winding wires, means for cutting notches in said side rods, into which notches said winding wires are adapted to be laid, means for swedging said winding wires, means for causing said cutting means to deliver cutting strokes simultaneously to said side rods from opposite directions along a line in a first common plane perpendicular to the axis of both of said side rods, and means for causing said swedging means to deliver swedging strokes simultaneously to said side rods from opposite directions along a line in a second common plane perpendicular to the axis of said side rods, means for causing said swedging means to deliver swedging strokes simultaneously to said side rods from opposite directions along a line in a plane perpendicular to the axis of both of said side rods, whereby any force of said strokes tending to bend said side rods out of a straight line is substantially cancelled, and means for simultaneously moving said cutting and swedging means along said winding arbor to change the diameter of said grid.

5. In a winding machine, a grid-forming mechanism adapted to wind and secure a plurality of helical winding wires wound parallel to each other around a pair of parallel side rod wires to form successive grids, means for cutting notches in each of said side rod wires, winding means for simultaneously carrying said winding wires around said side rod wires and winding said wires into said notches, swedging means for fastening each winding wire to said side rods by means of a tight connection at each successive turn, said cutting means adapted to deliver the force of said cutting strokes simultaneously to alternate and oppositely disposed turns at an axial distance of 180 degrees apart in a first common plane and said swedging means adapted to deliver the force of said swedging strokes simultaneously to alternate and oppositely disposed turns at an axial distance of 180 degrees apart in a second common plane.

References Cited in the file of this patent

UNITED STATES PATENTS

| | | |
|---|---|---|
| 1,807,892 | Brindle | June 2, 1931 |
| 1,897,460 | Anderson et al. | Feb. 14, 1933 |
| 2,181,288 | Washburn | Nov. 28, 1939 |
| 2,365,661 | Winslow | Dec. 19, 1944 |
| 2,495,251 | Hall | Jan. 24, 1950 |
| 2,719,543 | Maurer | Oct. 4, 1955 |